(12) United States Patent
Subramaniam et al.

(10) Patent No.: US 9,078,289 B2
(45) Date of Patent: Jul. 7, 2015

(54) SYSTEMS AND METHODS FOR FLEXIBLE WIRELESS CONNECTIVITY OF DEVICES

(75) Inventors: Ramanathan Subramaniam, Old Bridge, NJ (US); Hooman Kashef Hamadani, Coto De Caza, CA (US)

(73) Assignee: SMSC HOLDINGS S.A.R.L., Hauppauge, NY (US)

( * ) Notice: Subject to any disclaimer, the term of this patent is extended or adjusted under 35 U.S.C. 154(b) by 519 days.

(21) Appl. No.: 13/407,786

(22) Filed: Feb. 29, 2012

(65) Prior Publication Data
US 2012/0282967 A1    Nov. 8, 2012

Related U.S. Application Data

(60) Provisional application No. 61/481,933, filed on May 3, 2011.

(51) Int. Cl.
| | |
|---|---|
| *H04B 7/00* | (2006.01) |
| *H04H 20/71* | (2008.01) |
| *H04H 40/00* | (2008.01) |
| *H04W 84/22* | (2009.01) |

(52) U.S. Cl.
CPC .................................... *H04W 84/22* (2013.01)

(58) Field of Classification Search
CPC ..................................................... H04W 4/12
USPC ............................ 455/466, 452.1, 517, 519
See application file for complete search history.

(56) References Cited

U.S. PATENT DOCUMENTS

| | | | | |
|---|---|---|---|---|
| 8,005,217 | B2 * | 8/2011 | Pham et al. | 380/247 |
| 8,266,658 | B2 * | 9/2012 | Funabiki et al. | 725/81 |
| 8,325,679 | B2 * | 12/2012 | Taaghol et al. | 370/331 |
| 8,948,795 | B2 * | 2/2015 | Dudley | 455/466 |
| 2010/0050214 | A1 * | 2/2010 | Funabiki et al. | 725/81 |
| 2013/0142117 | A1 * | 6/2013 | Goldin | 370/328 |

* cited by examiner

*Primary Examiner* — Tilahun B Gesesse
(74) *Attorney, Agent, or Firm* — Slayden Grubert Beard PLLC (57) ABSTRACT

Embodiments of the present disclosure provide systems and methods to allow a multimedia device to operate in multiple modes of configuration simultaneously. The disclosed multimedia system includes a first communications circuitry having an access point connected to an external network and a number of devices. The first communications circuitry can receive and distribute media content over a wireless network, the wireless circuitry facilitating multi-modal simultaneous configuration of the multimedia device. The multi-modal simultaneous configuration includes a first mode and a second mode. The first mode facilitates exchange of data between the multimedia device and the other devices through the access point such as a wireless access point. The second mode facilitates direct exchange of data between the multimedia device and other devices in the wireless network without utilization of the access point. The multimedia device can change its mode of configuration based on a predefined trigger.

22 Claims, 11 Drawing Sheets

SYSTEMS AND METHODS FOR FLEXIBLE WIRELESS CONNECTIVITY OF DEVICES

CROSS-REFERENCE TO RELATED APPLICATIONS

This application claims the benefit of U.S. Provisional Patent Application No. 61/481,933, filed Mar. 5, 2011, which application is hereby incorporated by reference in its entirety.

TECHNICAL FIELD

The present disclosure relates generally to techniques and supporting multimedia systems for facilitating wireless connectivity among various devices, and, more specifically, to multimedia systems configured to allow multimedia devices to exchange data.

BACKGROUND

Current generation multimedia devices such as smart phones, mp3 players etc. support networking, including wireless networking. Also, the demand for networked and internet-based media is rising. One of the most common techniques for creating a home network uses wireless radio signal technology based on the IEEE 802.11 standard. When using wireless technology for home networking, a wireless access point (WAP) functions as the focal point of the home network. The various devices acting as Wi-Fi clients have to be within the range of the WAP to communicate with the WAP, which acts as a Wi-Fi server. Most devices that are wireless-capable operate at a frequency of 2.4 GHz or 5 GHz. The WAP admits or connects the requesting devices to the network if the device can provide authentic credentials. An important function of the home network or local area network is the sharing of Internet access, which is typically provided by a broadband service and a cable modem or Digital Subscriber Line (DSL).

In a conventional arrangement, all the network traffic is routed through the WAP. Thus, when any of the client devices exchange information with a device outside the network, the traffic is mediated through the WAP. Using this architecture, a network-connected multimedia device may support a wide range of services such as internet radio stations, FM radio, online video stores, video broadcast services, media stores and media servers. For example, audio and/or video content may be streamed from a remote location over the network, played from a local storage, or played from an electronic device docked to the multimedia device. The local storage may be a storage accessed over a local area network as opposed to local storage accessible directly from the multimedia system without involving any network, for example, a USB stick.

In a first scenario, where the content is streamed from a remote location over a WAN, such as an Internet radio service, the device providing the content is referred to as a "remote source". In a second scenario, another local device such as a laptop or personal computer (the "local source") hosts the media server and streams music over the local area network to the multimedia device. In this case, both the local source and the multimedia device rendering the media content are part of the local area network or the home network.

Typically, a multimedia device supporting wireless connectivity operates as a wireless client and must be configured to become a part of the wireless home network by providing the necessary credentials using a configuration process. After getting configured, the multimedia device connects to the WAP and thus becomes a part of the home network, and media content streamed to the multimedia device is routed through the WAP.

While the approach mentioned above for wireless networking works well when accessing multimedia content from a remote source, it suffers from many limitations when accessing the content from a local source present in the same local network.

One of the limitations is that both the local source and the multimedia device used for rendering must be within an operational range of the WAP. Further, if the WAP becomes unavailable due to some technical difficulties, the local source cannot communicate with the multimedia device. Moreover, the WAP introduces additional delays in the data path as all information exchanged in the network is routed via the WAP. Also, the bandwidth utilization of the wireless media is suboptimal because the same information is sent over the air twice, i.e., once from the local source to the WAP and then from the WAP to the multimedia device or the target device.

Therefore, there exists a need for systems and methods to exchange data among devices present in the same local or home network without the need for an intermediary device such as the WAP.

SUMMARY

Briefly described, and according to one embodiment, the present disclosure describes systems and methods for providing flexible wireless connectivity among devices. The present disclosure provides a multimedia system supporting a first communications circuitry. The first communications circuitry includes an access point connected to a number of devices with wireless capability. The first communications circuitry being operable to receive and distribute data between the devices. The first communications circuitry facilitates multi-modal simultaneous configuration of one or more of the devices. The multi-modal simultaneous configuration includes a first mode and a second mode. The first mode facilitates facilitating exchange of data between the devices through the access point. The second mode facilitates direct exchange of data between the devices without utilization of the access point. The mode of configuration is based on a predefined trigger.

According to another embodiment, the present disclosure describes a system including a wireless access point (WAP) connected to an external network and a number of devices by means of another network that can be an internal network. The WAP is configured to receive and distribute media content over a wireless network and the another network (or internal network). The WAP is also configured to enable exchange of data or media content among devices in the internal network such as a local area network. The system is configured to allow one or more of the devices to operate in multi-modal simultaneous configuration that includes a first mode and a second mode. The first mode is for exchange of content through the WAP and the second mode is for exchange of content between the devices without requiring the WAP.

Embodiments of the present disclosure further provide a method to allow a multimedia device to operate in multiple modes of configuration simultaneously. The method includes configuring the multimedia device to operate in a first mode to exchange data with other devices in a wireless network through a wireless access point (WAP). The method also includes configuring the multimedia device to operate in a second mode to exchange data with the other devices in the wireless network without routing the data through the WAP, based on a predefined trigger.

While embodiments of the present disclosure are amendable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

DETAILED DESCRIPTION

Overview

Embodiments of the present disclosure provide methods and systems for allowing a multimedia device to operate in multiple modes of configuration simultaneously. The disclosed multimedia system supports a first communications circuitry including an access point connected to an external network and a number of devices. The access point can be a wireless access point (WAP) connected to the internet. The devices may connect to the access point either through wired or wireless means. The first communications circuitry is operable to receive and distributes data or media content between the devices, wherein the first communications circuitry facilitates multi-modal simultaneous configuration of one or more of the devices. The multi-modal simultaneous configuration includes a first mode and a second mode. The first mode facilitates exchange of data between the devices through the access point such as a wireless access point. The second mode facilitates direct exchange data between the devices without utilization of the access point. The mode of configuration is based on a predefined trigger.

In accordance with an embodiment of the present disclosure—when a multimedia device is configured to operate in the second mode—the device broadcasts a unique service set identification (SSID). Other devices in the network may use this SSID to connect to the device broadcasting the SSID. Once connected—a local source i.e. a device present in the same local network can stream data to the multimedia system or other devices within the same local network without routing the data through the WAP. Additionally, the multimedia system or the device receiving the data from a multimedia device may forward the received data to other devices connected to it.

In another embodiment—the multimedia system may be configured to operate in the first mode and the second mode concurrently. Thus, the multimedia system is a part of two networks. Using the first mode it communicates with other devices via the WAP forming a first network. Using the second mode—it communicates with select devices directly—bypassing the WAP—forming a second network. The multimedia system being part of both the networks may bridge data received from a device on the first network to a device on second network or vice versa.

Exemplary Prior Art Systems

Figure 1:
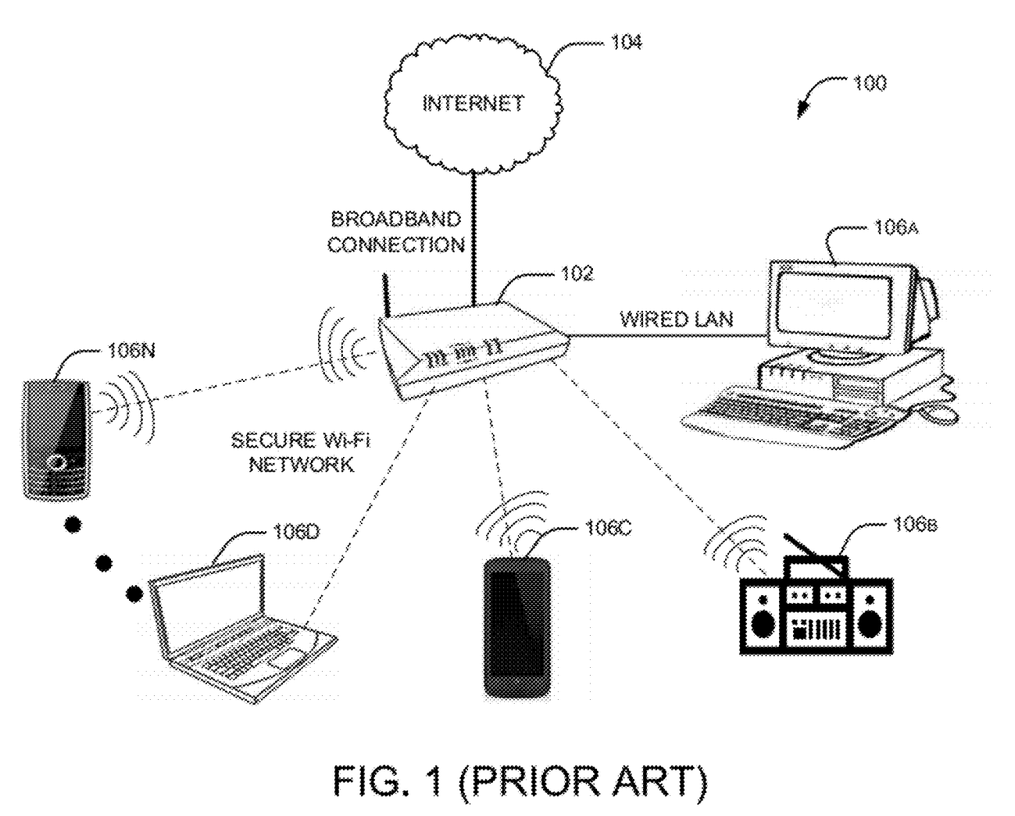
FIG. 1 illustrates a conventional Wi-Fi home network.

FIG. 1 illustrates a conventional Wi-Fi home network 100 including a variety of devices 106A-N. Examples of the devices 106A-N include, but are not limited to, desktop computers, laptop computers, Personal Digital Assistant (PDA), smart phones, and so forth. The devices 106A-N communicate with a wireless access point (WAP) 102 connected to an external network such as the Internet 104 either directly or indirectly via a modem (not shown). For example, the modem that interfaces with the broadband connection for the Internet connectivity may be a component of the WAP 102 itself, or, the modem may be external and the wireless access point (WAP) 102 connected to the external modem. The devices 106 can exchange data through an intermediary device such as the WAP 102. Therefore, the WAP 102 mediates on all the data that is exchanged between the devices 106A-N in the Wi-Fi network 100 and/or with the Internet 104.

The devices 106A-N may connect to the WAP 102 using any suitable communication medium such as wired or wireless medium. Some of the devices 106A-N may connect to the WAP 102 through a wired connection and some may connect to the WAP 102 through a wireless connection. For example, in the Wi-Fi home network 100 the desktop computer 106A can connect to the WAP 102 using a wired Ethernet connection, while the laptop 106D, a smart phone 106C, a music or audio system 106B etc. may connect wirelessly to the WAP 102 using for example, IEEE 802.11 wireless standard protocol.

Figure 2:
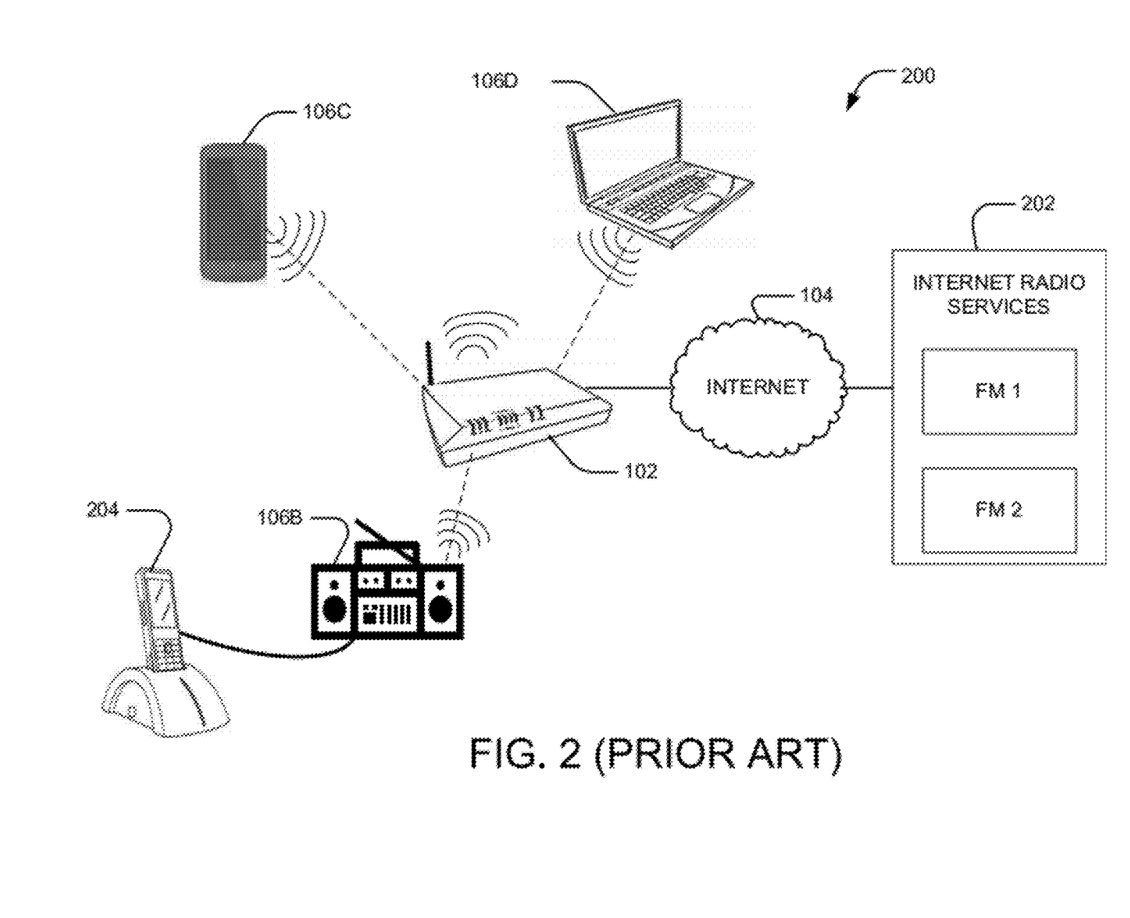
FIG. 2 illustrates a typical multimedia device connected to a Wireless Access Point (WAP) and accessing data from a remote source or over a local source.

FIG. 2 illustrates a typical multimedia device connected to the WAP 102 and accessing data from a remote source 202 or a local source. As discussed with reference to FIG. 1, a number of devices 106A-N may exchange data over a local network or home wireless network or over the Internet 104. The multimedia device can be any device such as a device 106B present in a wireless home network 100 or the communication network 200. Hereafter, the device 106B may be referred as the multimedia device 106B. The multimedia device 106B includes systems that are primarily used to render or play media content, such as audio speakers, portable audio systems, video players, and audio/video receivers. The multimedia device 106B may support a wide range of services such as the Internet radio stations, FM radio stations, online video stores, video broadcast services, media stores and media servers. The multimedia device 106B interacts over a communication network 200, and the audio and/or video content may be streamed from a remote source 202 over the Internet or played from a local storage or source such as an electronic device 204 docked to the multimedia device 106B.

Figure 3:
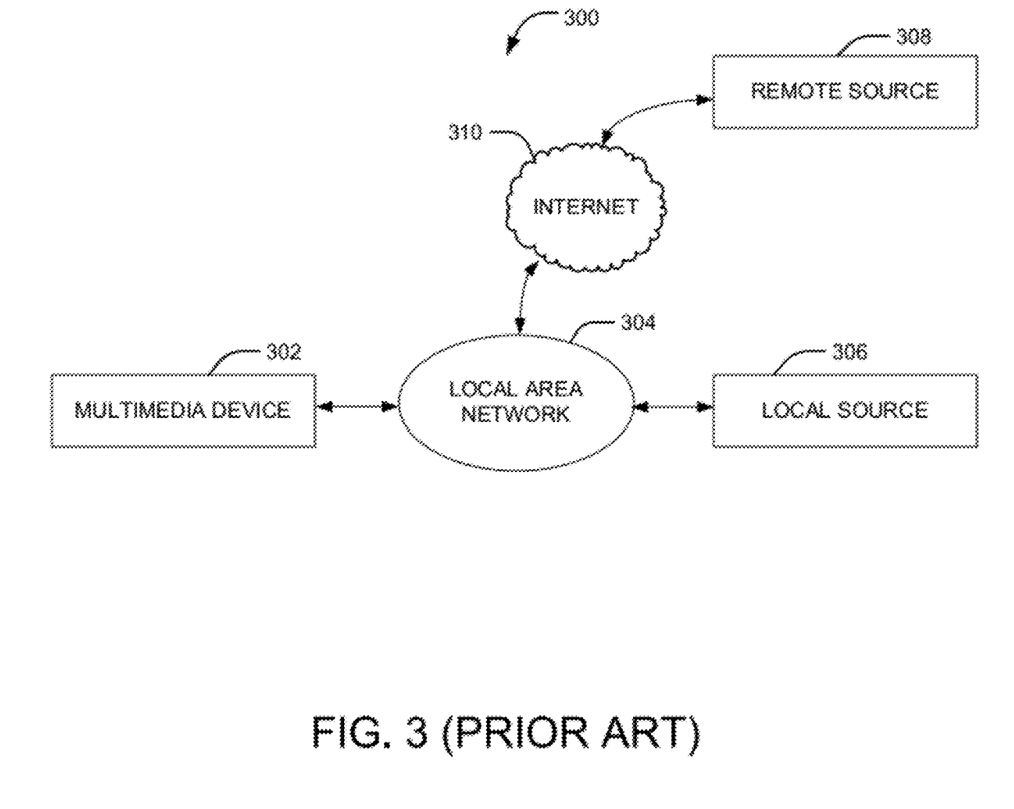
FIG. 3 illustrates a conventional system for accessing data by the multimedia device from two types of sources.

As shown in FIG. 3, the media content may be sourced from a remote device or a remote source 308 over an external network such as the Internet 310 to the multimedia device 302. Alternatively, the media content may be streamed to the multimedia device 302 from a device attached to the same home network or Local Area Network (LAN) 304 as a device or a local source 306.

Figure 4A:
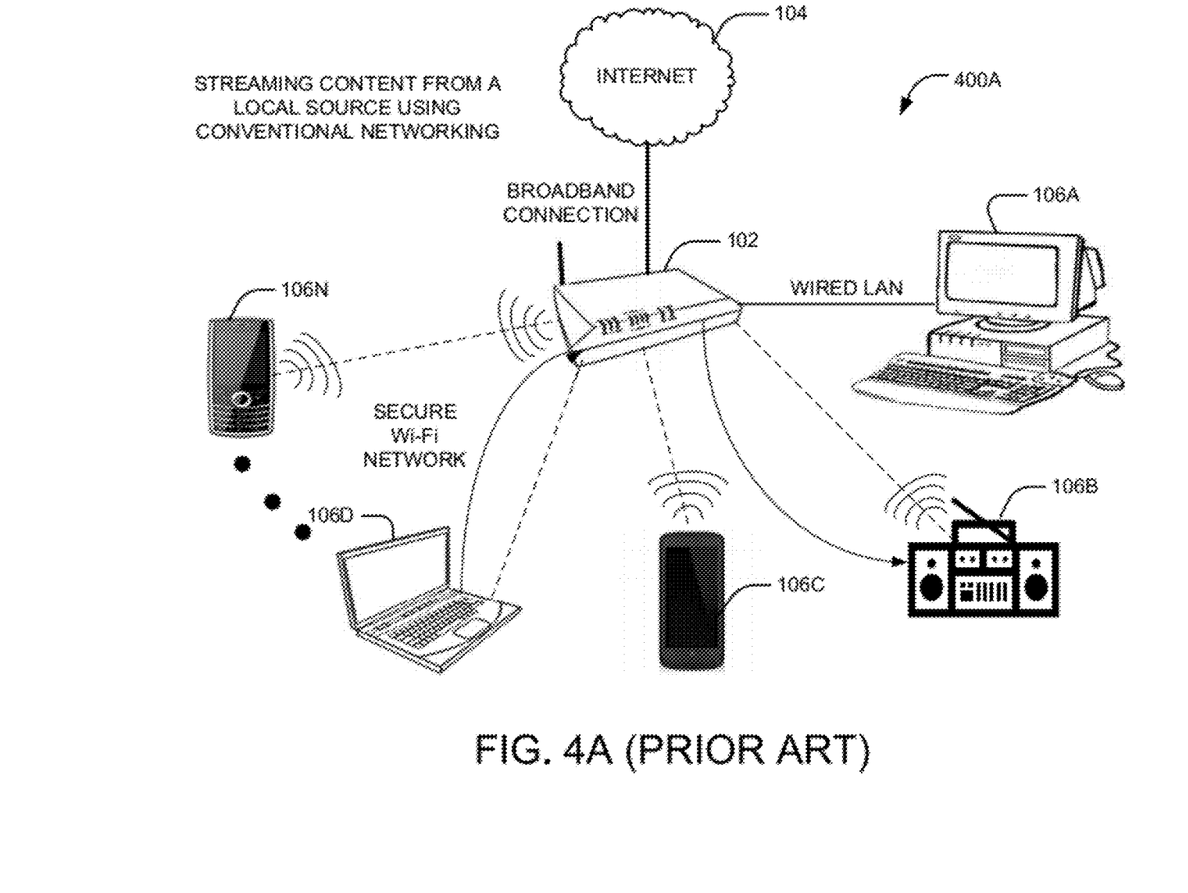
FIG. 4A illustrates an exemplary flow of information among various devices in a conventional wireless home network.

FIG. 4A illustrates the flow of information among the components of a conventional Wi-Fi home network 400A. As discussed with reference to FIGS. 1 and 3, the devices 106A-N can exchange information or media content with each other over the same wireless network 304 without involving any external network such as the Internet 104 or 310. For example, the audio/video system 106B can receive data from the laptop 106D present in the same wireless network. In such a scenario, the laptop 106D is present in the same network and acting as a source of information so it can be referred as a local source 106D, and the audio/video system 106B here is the recipient device or the multimedia device 106B receiving the media content. The local source 106D and the multimedia device 106B are connected to the same WAP 102 and any information exchanged between them are mediated by the WAP 102. Therefore, when the laptop 106D wants to send some information to the multimedia device 106B, first it is received by the WAP 102 and then it is forwarded to the multimedia device 106B. This may result in additional delays in data path. Further, in such a scenario, if the WAP 102 becomes unavailable then the local source cannot communicate with the multimedia device 106B. In addition, to exchange data via the WAP 102, both the devices i.e. the local source (or the laptop 106D) and the multimedia device 106B should be in operational range of the WAP 102.

Figure 4B:
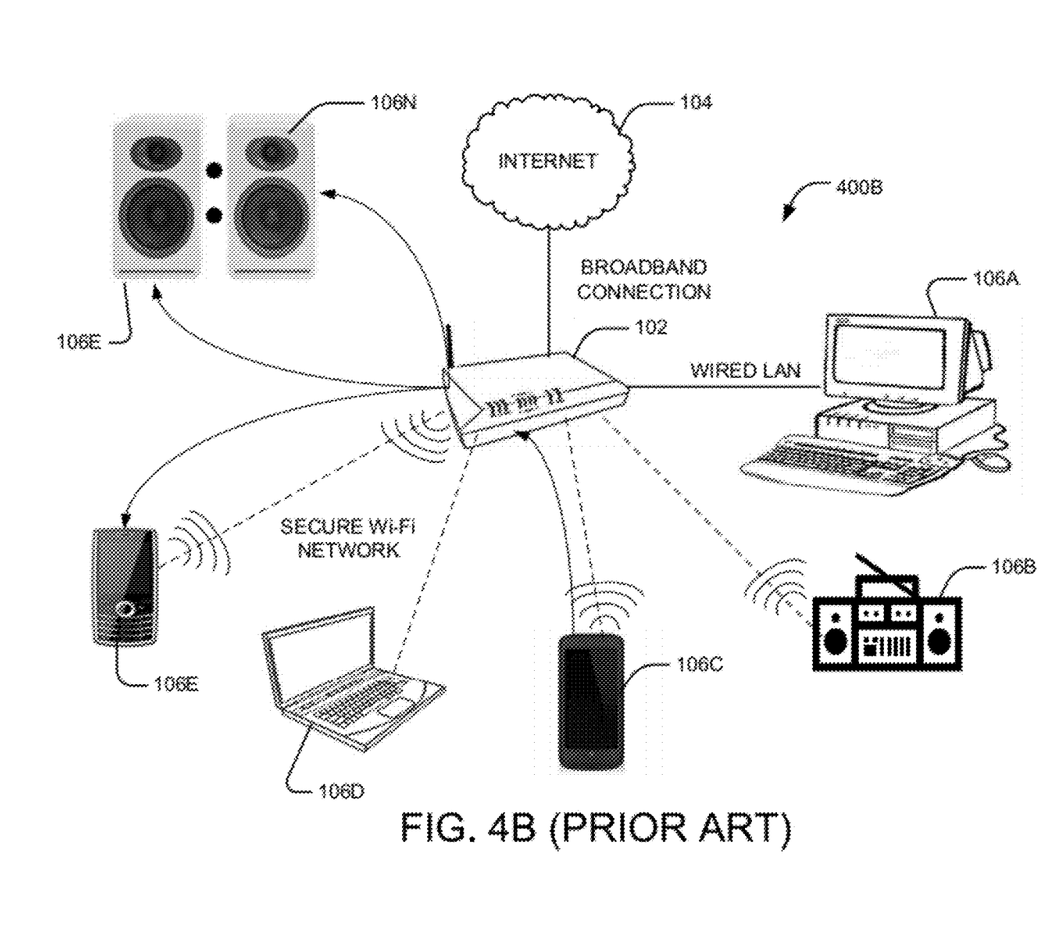
FIG. 4B illustrates an exemplary flow of information among devices when a multimedia device streams information received from a local source to multiple devices that are connected to the conventional wireless network.

FIG. 4B illustrates the flow of information among various devices when the multimedia device (depicted as the audio system) streams information received from a local source (laptop) to multiple devices that are connected to a conventional Wi-Fi network 400B. Referring now to FIG. 4B, multiple audio systems are shown and a local source i.e. the laptop 106D streams music to the multimedia device 106B. In addition to playing the media, the multimedia device 106B can stream the media content to the other devices such as other audio systems or smart phones in the Wi-Fi network 400B. All information and media content exchange will happen via the WAP 102.

When using the conventional wireless networking model the multimedia device 106B behaves as a Wi-Fi client and connects to the WAP 102 to become a part of the Wi-Fi network 400B, which in some instances, may be less than optimal. For example, the WAP 102 needs to mediate all data exchanged among the devices 106A-N of the wireless or Wi-Fi network 400B. In addition, all data must traverse the air twice—once from the local source 106D to the WAP 102 and then from the WAP 102 to the target device i.e. the multimedia device 106B. This may result in poor utilization of the bandwidth available over the wireless media. Further, both the local source 106D and the multimedia device 106B must be within the operational range or reach of the WAP 102—i.e., both the local source 106D and the target multimedia device 106B must have good connectivity with the WAP 102. The availability of the WAP 102 is a must in order for information to be exchanged between the local source 106D and the multimedia device 106B, meaning that if the WAP 102 ceases to function, no data can be exchanged or streamed among these devices.

While this traditional wireless networking model may be useful when the multimedia device 106B sources content from a remote source, it may not be the optimal solution when sourcing the content from the local source 106D. The present disclosure provides a solution to overcome these limitations by providing a connected multimedia device supporting wireless connectivity in which the multimedia device is configured to operate in different Wi-Fi modes. As described above, the disclosed system may be configured to operate in a first mode (or "normal Wi-Fi mode") to function as a Wi-Fi client connected to the WAP 102 when the content is retrieved from a remote source, and in a second mode the multimedia device may exchange data without requiring the WAP.

Figure 5:
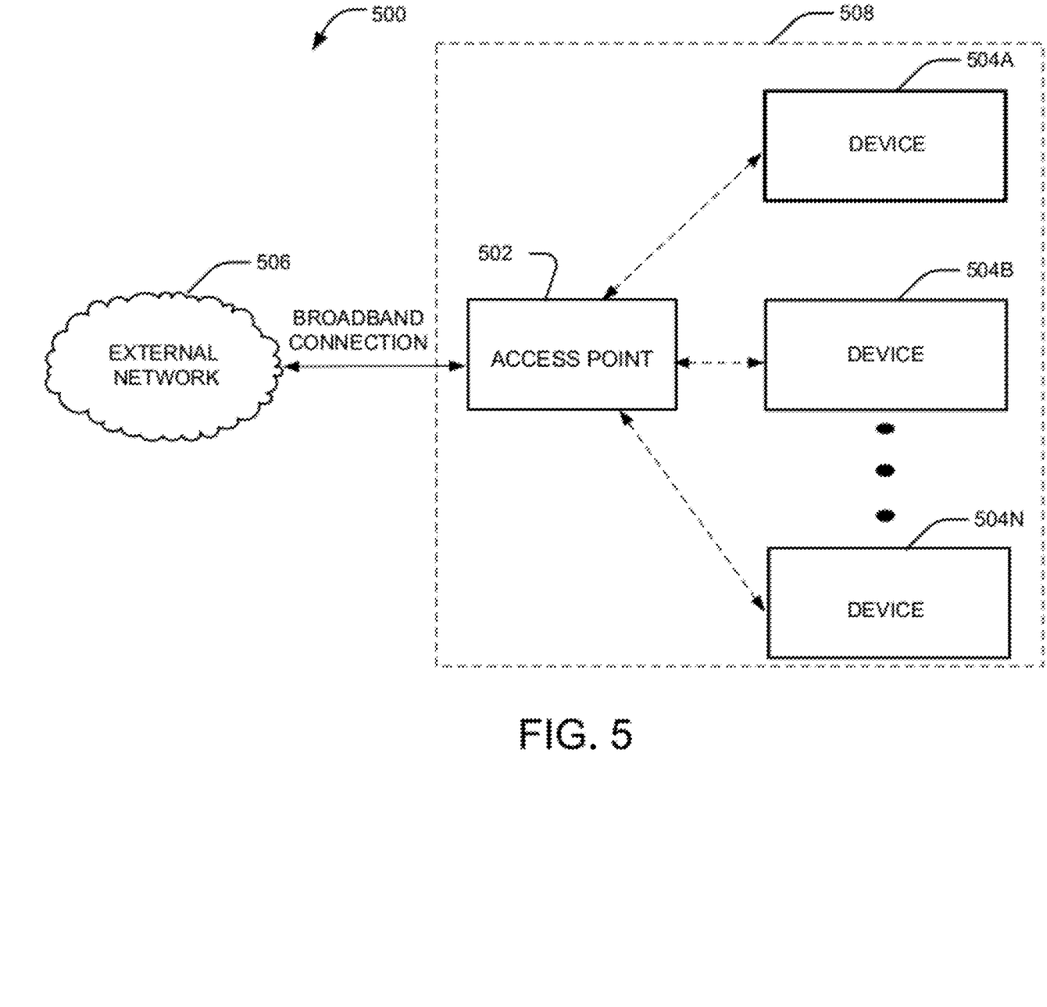
FIG. 5 illustrates an environment where various embodiments of the present disclosure may function.

FIG. 5 illustrates a system 500 where various embodiments of the present disclosure may function. The system 500 (or the multimedia system 500) includes first communications circuitry that has an access point 502 (or wireless access point 502) connected to an external network such as the Internet 506 through a broadband connection. The WAP 502 may also connect to a number of devices 506A-N with wireless capability. In one embodiment, the WAP 502 may be connected to the external network and devices 506A-N by means of another network. The WAP 502 can be any device that allows wireless connection using Bluetooth, Wi-Fi or related standards. The WAP 502 is also configured to receive data from the Internet 506 and distribute the data among devices 506A-N over the wireless network 508. Further, the WAP 502 is configured to receive and distribute the data or media content over the external network 506 and the another network or a local network 508. The first communications circuitry facilitates multi-modal simultaneous configuration of one or more of the devices 506A-N. The configured device can be any device that can render or play media content, such as audio speakers, portable audio systems, video players, smart phones, and audio/video receivers. The configured device may support a wide range of services such as the Internet radio stations, FM radio stations, online video stores, video broadcast services, media stores and media servers. A first mode facilitates exchange of data or media content between the devices 506A-N through the WAP 502. On the other hand, a second mode facilitates direct exchange of data between the devices 506A-N without directly without involving the WAP 502 or the external network 506. Further, the multimedia device can switch from first mode to the second mode or vice versa based on a predefined trigger. The trigger may be defined by a user, the multimedia device, the WAP 502, or the other devices 506A-N in the wireless network 508.

Figure 6A:
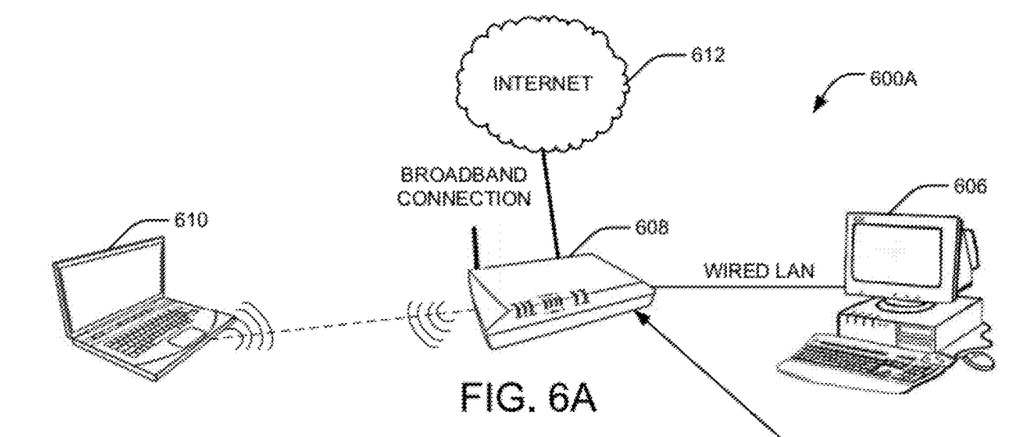
FIG. 6A-6B illustrate a multimedia device interfacing wither indirectly or directly with another device, in accordance with an embodiment of the present disclosure.
Figure 6B:
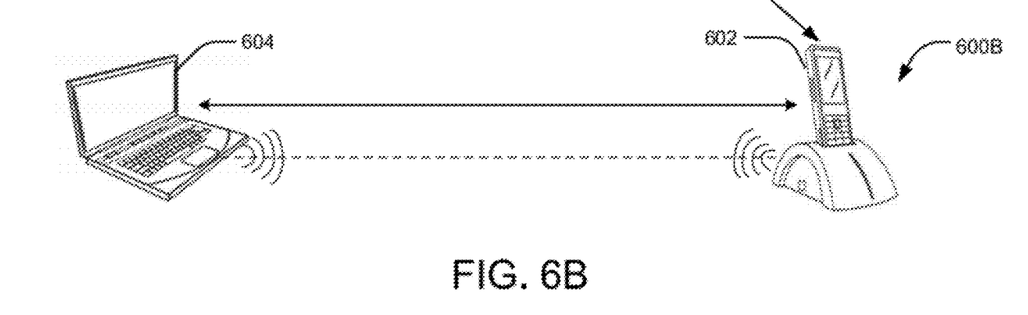

FIG. 6 illustrates a multimedia device interfacing either indirectly (FIG. 6A) or directly (FIG. 6B) with another device, in accordance with an embodiment of the present disclosure. A multimedia device 602 can operate in a second mode to retrieve content from a local source such as a laptop 604. In the second mode, the multimedia device 602 and the laptop 604 serving as the local source can communicate directly over the Wi-Fi interface and can bypass the WAP 608. In another embodiment, the multimedia device 602 is configured to operate in a first mode and the second mode simultaneously in the Wi-Fi network 600. This results in partitioning of Wi-Fi network 600 into two networks i.e. a standard network 600A with internet access, and a private network 600B.

In the standard network 600A, other devices such as another laptop 610 can communicate with other devices present in an external network such as the Internet 612 through the WAP 608. The first mode facilitates exchange of data between the multimedia device 602 and the other devices present in the external network or same Wi-Fi network 600A through the WAP 608. In the private network 600B, the multiple devices can exchange data with the multimedia device 602 directly using the second mode To operate in the second mode, the multimedia device 602 can switch from the normal operating mode or the first mode to the second operating mode based on a predefined trigger. The trigger may be initiated by a user, or, in some cases by the multimedia device 602, the WAP 608 or other device that recognizes a particular state change. For example, the trigger can be generated using a push button on the multimedia device 602. Alternatively, the multimedia device 602 may be reconfigured to operate in the second mode (or alternate Wi-Fi mode) by executing a configuration process. The second mode facilitates direct exchange of data between the multimedia device 602 and the other devices in the Wi-Fi network 600B without utilization of the WAP 608.

When operating in the second mode, the multimedia device 602 may also concurrently operate in the first mode, but may also configure itself as a WAP by broadcasting a well-known Service Set Identification (SSID). SSID is a function performed by an access point such as the WAP 608 or the multimedia device 602 that transmits its name so that other wireless devices searching for a network connection can find the access point. In an embodiment, the SSID can be a user defined string, for example, the WAP 608 may be configured to use a SSID—"Home NW" and the multimedia device 602 may be configured to use a SSID—"Media NW". The local source such as the laptop 604 is configured as a wireless client that connects to the private network 600B associated with the SSID broadcast. In an exemplary situation, when two networks or WAPs have the same SSID, wireless devices on one network may try to connect to the other network, which can cause problems. This may happen when two different networks use hardware or WAP from the same vendor with the same default SSID. To avoid such problems, therefore the multimedia device 602 acting as a WAP should configure a unique SSID that won't conflict with other networks, now or in the future.

The local source 604 streams media to the multimedia device 602 directly, bypassing the regular WAP 608 in favor of the multimedia device 602. As a result two parallel networks i.e. the standard network 600A and the private network 600B are established—one being the regular home network or first communications circuitry i.e. the standard network 600A with access to the internet, and the other being another private Wi-Fi network 600B between the laptop 604 and the multimedia device 602.

Figure 7:
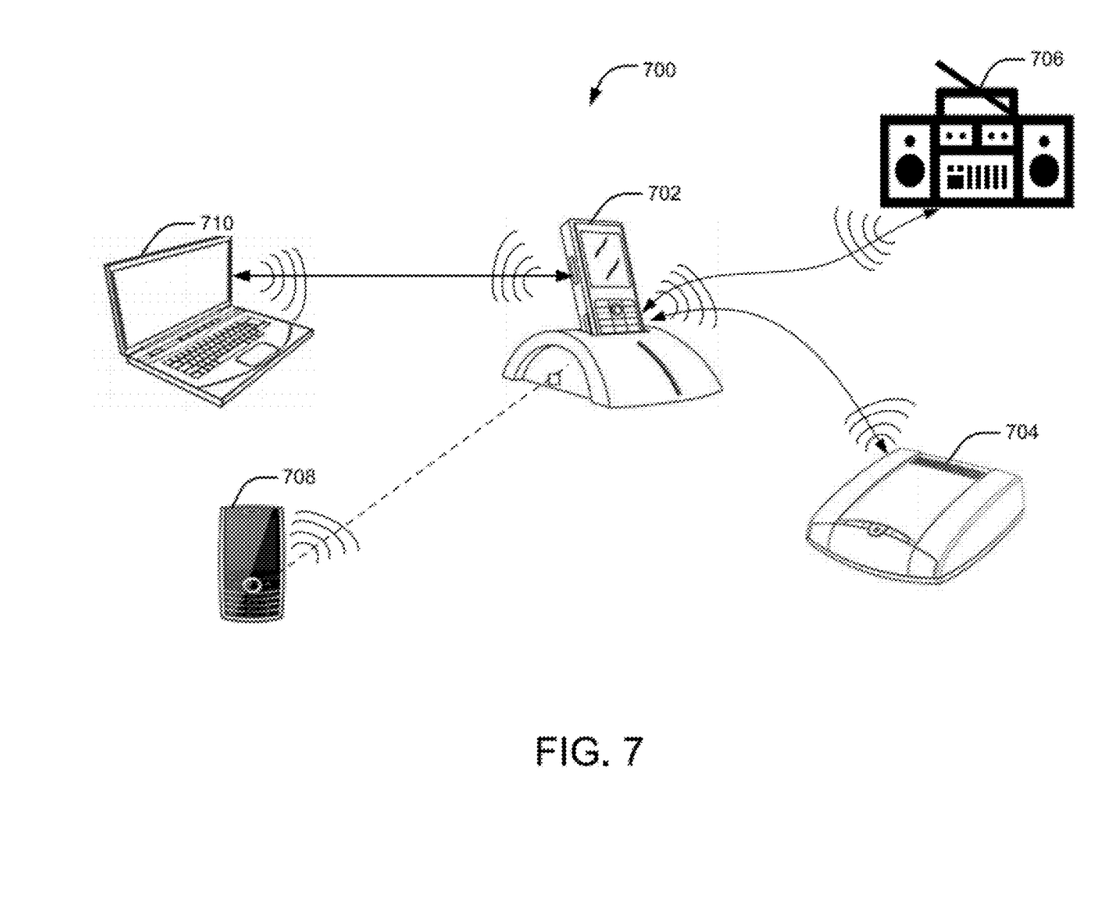
FIG. 7 illustrates the flow of information when a multimedia device is configured to operate in a second mode, in accordance with an embodiment of the present disclosure.

FIG. 7 illustrates the flow of information when a multimedia device 702 is configured to operate in a second mode, in accordance with an embodiment of the present disclosure. While operating in the second mode, the multimedia device 702 can directly stream or exchange information with a local source. The local source can be a laptop 710 or any other device such as a music system 706, a set top box 704, a smart phone 708, and so forth in Wi-Fi network 700. This is accomplished bypassing the conventional WAP (not shown).

In contrast to the traditional wireless networking method, this networking model does not mandate using an Access Point (WAP) to serve as an intermediary facilitating the communications between the device serving as the local source and the multimedia device 702. A device like a laptop 710 or PDA (not shown) is able to directly interface with the multimedia device 702, using the same wireless media and stream information to it, and as a result, use the bandwidth available on the Wi-Fi media more effectively.

Figure 8A:
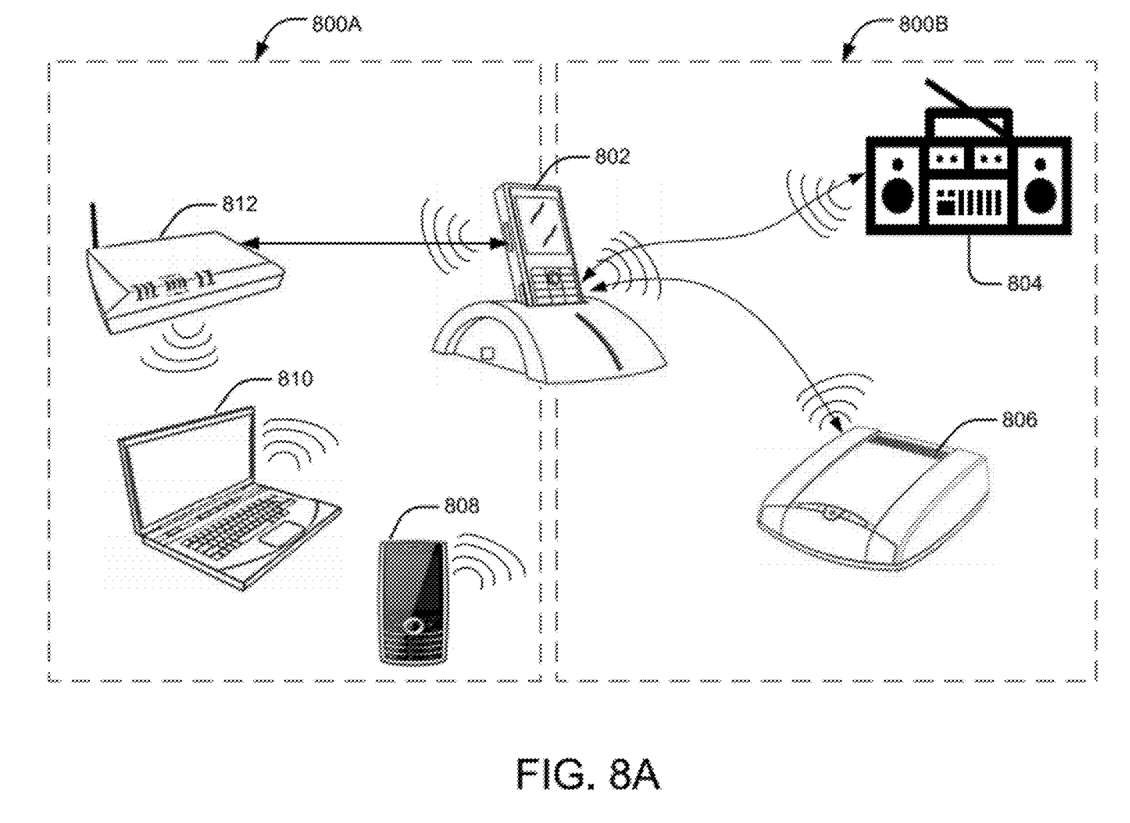
FIG. 8A illustrates a multimedia device supporting multiple networking interfaces such as Wi-Fi and wired Ethernet, in accordance with an embodiment of the present disclosure.

FIG. 8A illustrates a multimedia device 802 supporting multiple networking interfaces such as a wired Ethernet and a Wi-Fi interface, in accordance with an embodiment of the present disclosure. The wireless multimedia device 802 may support Ethernet connectivity, and the Ethernet interface may be used to connect the multimedia device 802 to a conventional, wired network. Concurrently, the multimedia device 802 operates in the second mode and lets other devices such as an audio system 804 and a set top box 806 interface with it directly via the Wi-Fi interface. There are two independent networks i.e. a first network 800A and another network 800B established—with the electronic multimedia device being part of both networks.

Figure 8B:
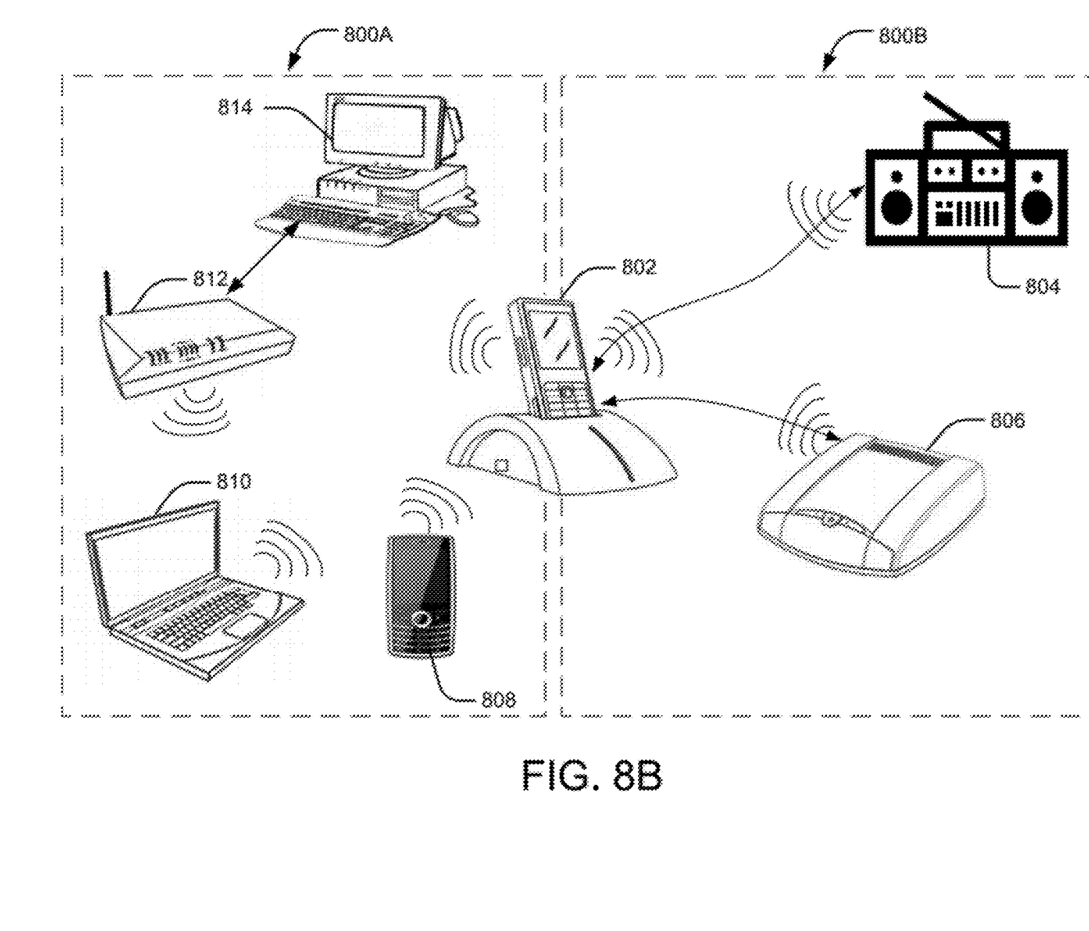
FIG. 8B illustrates a wireless system in which a multimedia device supports two virtual Wi-Fi interfaces, one as a wireless client connected to a wireless access point of a regular home network, and another as an access point operating in a second mode, establishing a separate private network permitting other wireless electronic devices to connect to it directly.

FIG. 8B illustrates a wireless system in which the multimedia device 802 supports two Wi-Fi interfaces, one configured as a wireless client to connect to a wireless access point 812 of a regular home network, and other configured as an access point operating in a second mode, establishing a separate private network i.e. the another network 800B permitting other wireless electronic devices to connect to it directly. In another embodiment of the present disclosure, the multimedia device 802 supports a single physical Wi-Fi interface that is portioned into two Wi-Fi interfaces—each of which may be independently configured. Further, the multimedia device 802 can be configured to become a part of two independent networks i.e. network 800A and 800B through the Wi-Fi interfaces. The first Wi-Fi interface may be configured to connect to the WAP 812—and the second Wi-Fi interface may be used to create the private network 800B—in which devices exchange multi-media content bypassing the WAP.

The second Wi-Fi interface may be configured to operate in the second mode or an alternative Wi-Fi mode, thereby letting other devices interface with it directly. The two virtual Wi-Fi interfaces may be operated concurrently.

Figure 9:
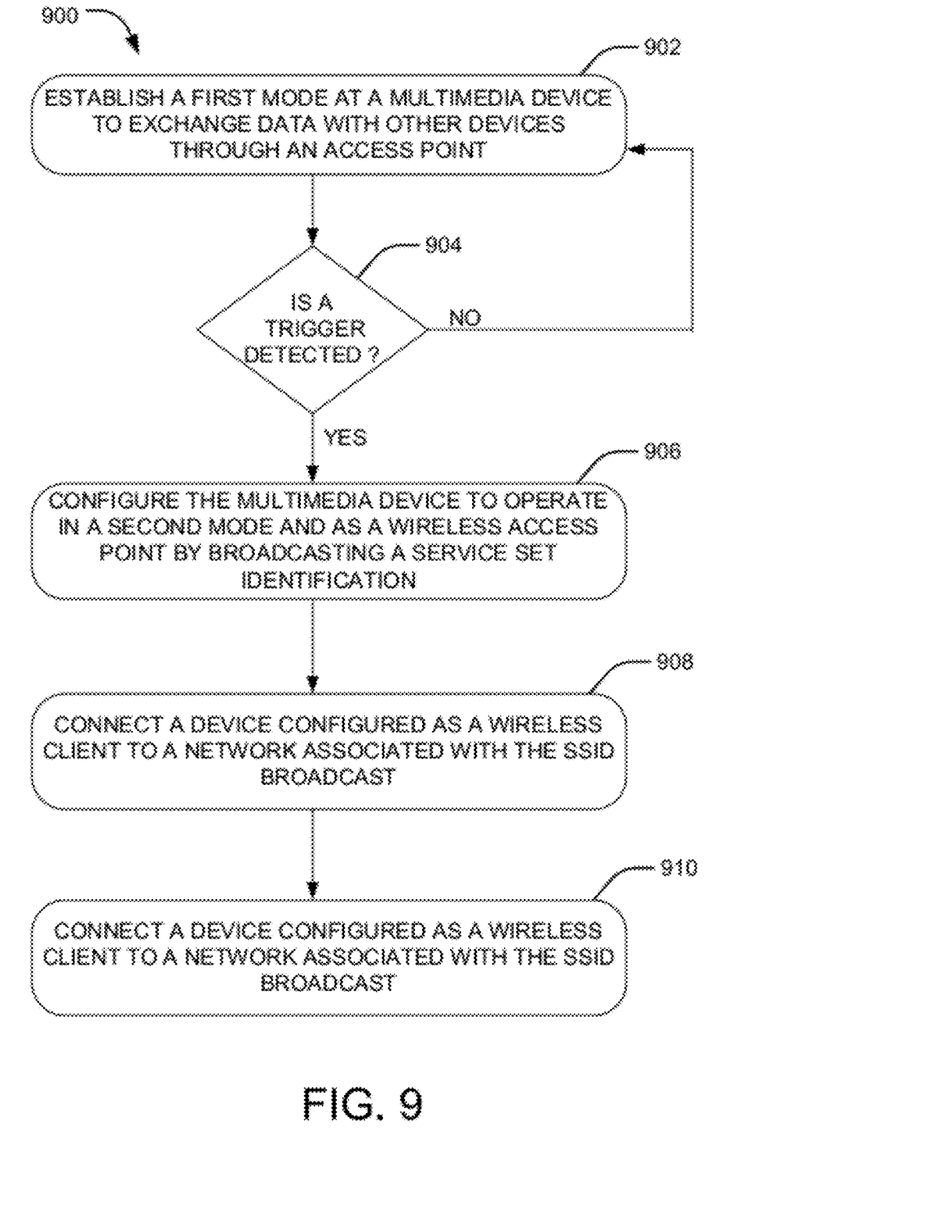
FIG. 9 is a flowchart depicting an exemplary method to allow a multimedia device to operate in one or more modes of configuration, in accordance with an embodiment of the present disclosure.

FIG. 9 is a flowchart depicting an exemplary method to allow a multimedia device to operate in multiple modes of configuration simultaneously, in accordance with an embodiment of the present disclosure. As discussed with reference to FIGS. 5-8, the wireless network includes a wireless access point (WAP) connected to an external network and a number of devices. One or more of these devices are multimedia devices and support and can play media content such as audio, video and so forth. In addition, the multimedia device can operate in multiple modes of configuration simultaneously in the wireless network. Further, when the multimedia device is operating in the first mode, it exchanges data with other devices in the wireless network or the external network through the WAP. Alternatively, when the multimedia device is configured in the second mode, the data is exchanged with other devices in the same wireless network directly without involving the WAP. The method 900 illustrated in FIG. 9 may be used in conjunction with any of the systems or devices shown in the previously described figures, as well as other devices. In various embodiments, some of the method elements shown may be performed concurrently, in a different order than shown, or may be omitted. Additional method elements may be performed as desired. As shown, the method 900 may operate as follows.

At step 902, the multimedia device establishes a first mode to exchange data with other devices in the wireless network through an access point such as the wireless access point. Then at step 904, a check is performed whether a trigger is detected or not. The trigger can be a predefined trigger defined or initiated by a user, the WAP, the multimedia device, or other devices of the wireless network. If the trigger is not detected at step 904, the system continues to operate in the first mode as mentioned in step 902, otherwise the method control goes to step 906. At step 906, the multimedia device switches to the second mode and configures itself as a wireless access point by broadcasting a known service set identification (SSID). Thereafter, at step 908, at least one of the multiple devices in the same wireless network detects and connects to a network associated with the SSID broadcast. Finally, at step 910, the multimedia device and the connected device exchanges data directly without involving the WAP. The multimedia device can operate in the first mode and the second mode concurrently in the wireless network.

The methods and systems discussed in the present disclosure provide techniques to authenticate the media devices connected to the accessory devices by using a single authentication processor. Further, the authentication system may be extended easily for multiple media devices or accessory devices.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A multimedia system comprising:
a first communications circuitry including an access point connected to a plurality of devices with wireless capability, the first communications circuitry being operable to receive and distribute data between the devices,
wherein the first communications circuitry facilitates configuration of a first device of the plurality of devices for multi-modal communication with a second device of the plurality of devices, the configuration resulting in two different modes of communication between the first device and the second device;
wherein a first mode of the two different modes facilitates exchange of data between the configured first device and the second device, wherein the exchange of data is through the access point; and
wherein a second mode of the two different modes facilitates wireless exchange of data directly between the configured first device and the second device, wherein the wireless exchange is without utilization of the access point; and
wherein the mode of configuration is based on a predefined trigger.

2. The multimedia system of claim 1, wherein the configured device communicates in the first mode via a first wireless interface and communicates in the second mode via a second wireless interface.

3. The multimedia system of claim 1, wherein the configured device can simultaneously exchange data via the first mode and the second mode.

4. The multimedia system of claim 3, wherein at least one device is configured to operate as an access point in the second mode and allowing other devices to connect to the multimedia device directly bypassing the WAP.

5. The multimedia system of claim 3, wherein the configured device provides a known set identification (SSID) as a network name while operating in the second mode.

6. The multimedia system of claim 5, wherein the configured device is configured to act as a wireless access point by broadcasting a known SSID in the second mode of configuration.

7. The multimedia system of claim 6, wherein each of the plurality of devices is configured to operate in the first mode and the second mode concurrently.

8. The multimedia system of claim 1, wherein the access point is a wireless access point (WAP).

9. The multimedia system of claim 1, wherein at least one device of the plurality of devices is configured to act as a wireless client connected to a network associated with the SSID broadcast by the configured device and exchange content with the device configured as an access point directly without requiring routing of the data through the WAP.

10. The multimedia system of claim 1, wherein the plurality of devices are connected to the access point through at least one of a wireless or wired means.

11. A system comprising:
a wireless access point (WAP) connected to an external network and to a plurality of devices by an internal network, the WAP being configured to receive and distribute media content over the external network and the internal network,
wherein the system allows a first device of the plurality of devices to be configured operate in multi-modal communication with a second device or the plurality of devices, the configuration resulting in two distinet modes of communication between the first device and the second device
wherein a first mode of the two distinct modes facilitates exchange of content between the first device and the second device, wherein the exchange of content is through the WAP; and
wherein a second mode of the two distinct modes facilitates wireless exchange of content between the first device and the second device, wherein the wireless exchange does not utilize the WAP.

12. The system of claim 11, wherein the first device communicates simultaneously in the first mode via a first wireless interface and in the second mode via a second wireless interface.

13. The system of claim 11, wherein at least one device of the plurality of devices is configured to operate as a wireless client in the first mode and as an access point in the second mode.

14. The system of claim 13, wherein the at least one device is configured to change its mode of configuration based on a predefined trigger, the trigger being defined by at least one of a user, the multimedia device, the WAP, or by one or more of the devices in the another network.

15. The system of claim 14, wherein the configured device acting as an access point in the second mode provides known service set identification SSID) as a network name in the second mode.

16. The system of claim 15, wherein at least one device of the plurality of devices is configured to act as a wireless client connected to a network associated with the SSID broadcast by the configured device and exchange content with the device configured as an access point directly without requiring routing of the data through the WAP.

17. The system of claim 11, wherein the plurality of devices are connected to the WAP through at least one of a wireless or wired means.

18. The system of claim 11, wherein each of the plurality of devices is configured to operate in the first mode and the second mode concurrently.

19. A method for using a multimedia device to operate in multiple modes of communication with a source device, the method comprising:
- configuring the multimedia device to operate in a first mode of communication with the source device, wherein the first mode facilitates the exchange of data with the source device through a wireless access point (WAP); and
- based on a predefined trigger, configuring the multimedia device to operate in a second mode of communication with the source device, wherein the second mode facilitates wireless exchange of data directly with the source device without routing of the data through the WAP.

20. The method of claim 19, wherein the multimedia device operates as a wireless client in the first mode and as a mode-specific wireless access point in the second mode.

21. The method of claim 20, wherein establishing the second mode comprises:
- configuring the multimedia device as the mode-specific wireless access point by broadcasting a known SSID;
- connecting at least one device of the plurality of devices which is configured as a wireless client to a network associated with the SSID broadcast; and
- exchanging content between the connected device and the multimedia device directly.

22. The method of claim 19, wherein at least one device of the plurality of devices is configured to act as a wireless client connected to a network associated with the SSID broadcast by the multimedia device and exchange content with the multimedia device configured as an access point directly without requiring routing of the data through the WAP.

* * * * *